United States Patent [19]

Martindale

[11] 4,346,506
[45] Aug. 31, 1982

[54] PALLET MACHINE

[75] Inventor: Troy E. Martindale, Reynoldsburg, Ohio

[73] Assignee: The B. F. Goodrich Company, New York, N.Y.

[21] Appl. No.: 201,653

[22] Filed: Oct. 28, 1980

[51] Int. Cl.³ .............................................. B23P 19/04
[52] U.S. Cl. ....................................... 29/239; 29/252; 83/477.1; 83/925 R
[58] Field of Search ......................... 29/251, 252, 239; 83/477, 477.1, 34, 925 R, 404.4, 471.2, 488, 489

[56] References Cited

U.S. PATENT DOCUMENTS

| | | |
|---|---|---|
| 3,823,861 | 7/1974 | Jureit et al. |
| 3,846,890 | 11/1974 | Bielkiewicz ............................ 29/252 |
| 3,869,780 | 3/1975 | Ginnow et al. |
| 3,899,816 | 8/1975 | Jennings ................................ 29/252 |
| 3,916,498 | 11/1975 | Lopez et al. ........................... 29/239 |
| 4,051,588 | 10/1977 | Conkle . |
| 4,089,098 | 5/1978 | DeMarco .............................. 29/239 |
| 4,152,819 | 5/1979 | Conkle . |
| 4,241,495 | 12/1980 | Wakeem ................................ 29/252 |

*Primary Examiner*—Robert C. Watson
*Attorney, Agent, or Firm*—Joseph Januszkiewicz

[57] ABSTRACT

An apparatus for the disassembling and the repairing of nailed wooden pallets having upper and lower deckboards nailed to stringers. The apparatus has a carriage that is reciprocable across a support frame. The carriage has a pair of longitudinally extending supports with cutters at the end thereof for movement therewith. Inverting apparatus is mounted on said carriage and connected to said carriage supports for rotating said carriage supports and their cutters selectively 180° to align said cutters with a stringer in a pallet. A locking apparatus are used for securing the pallets on said support frame for the cutting of the nails that secure the deckboards to the stringers.

8 Claims, 7 Drawing Figures

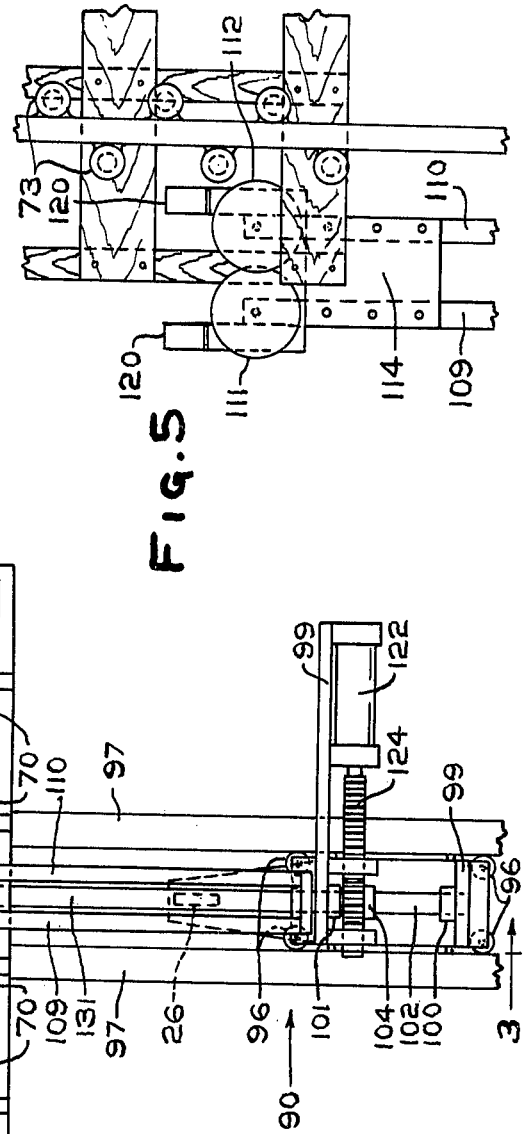
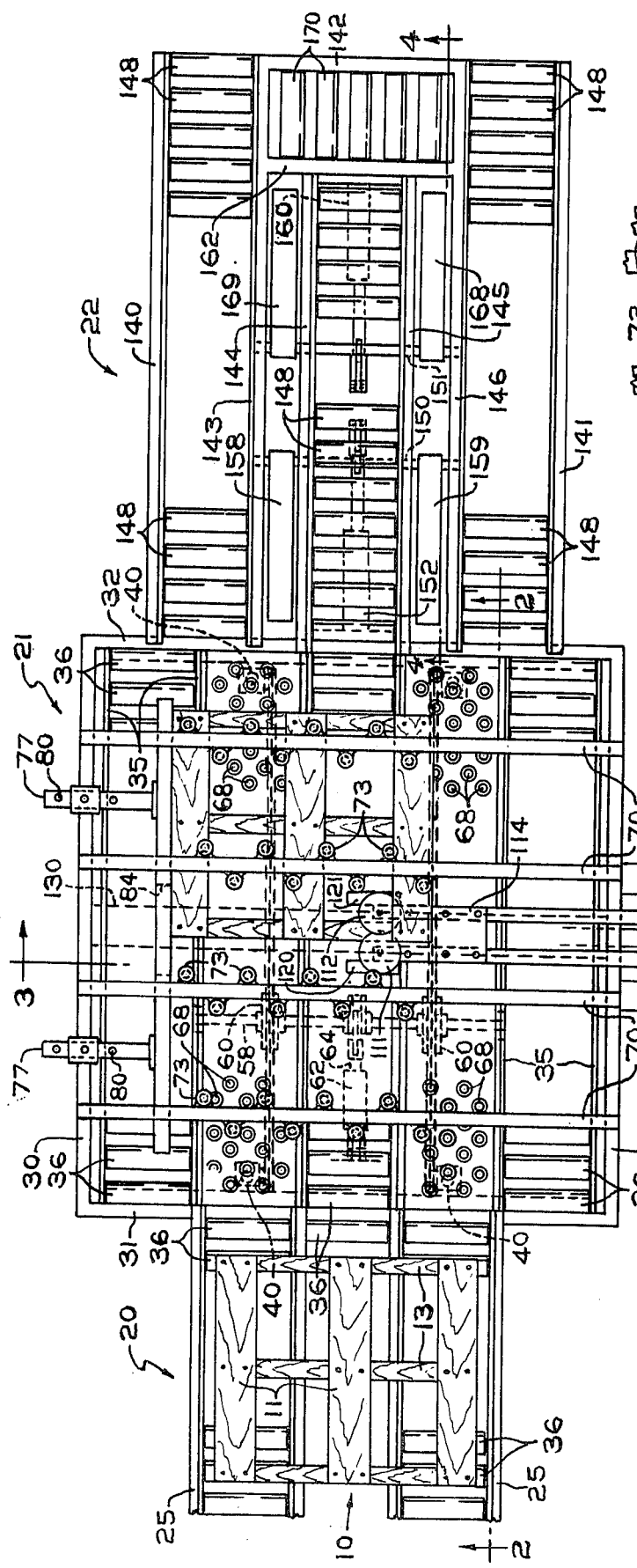

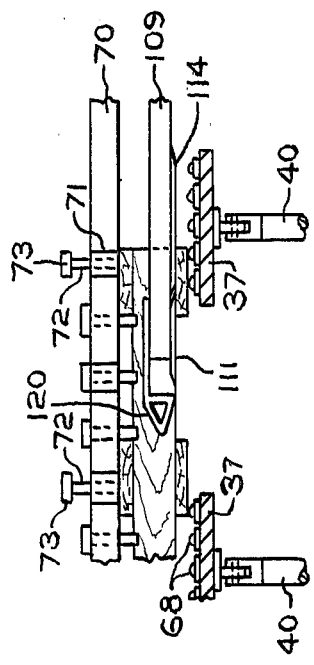
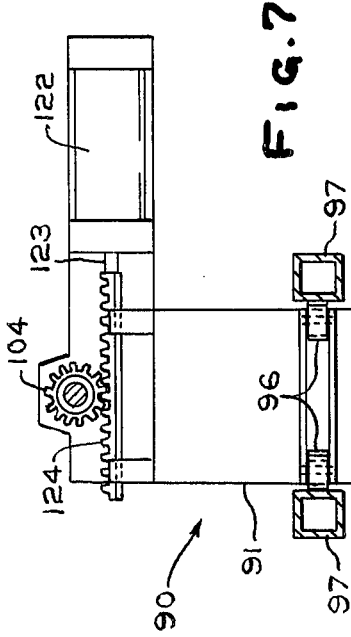
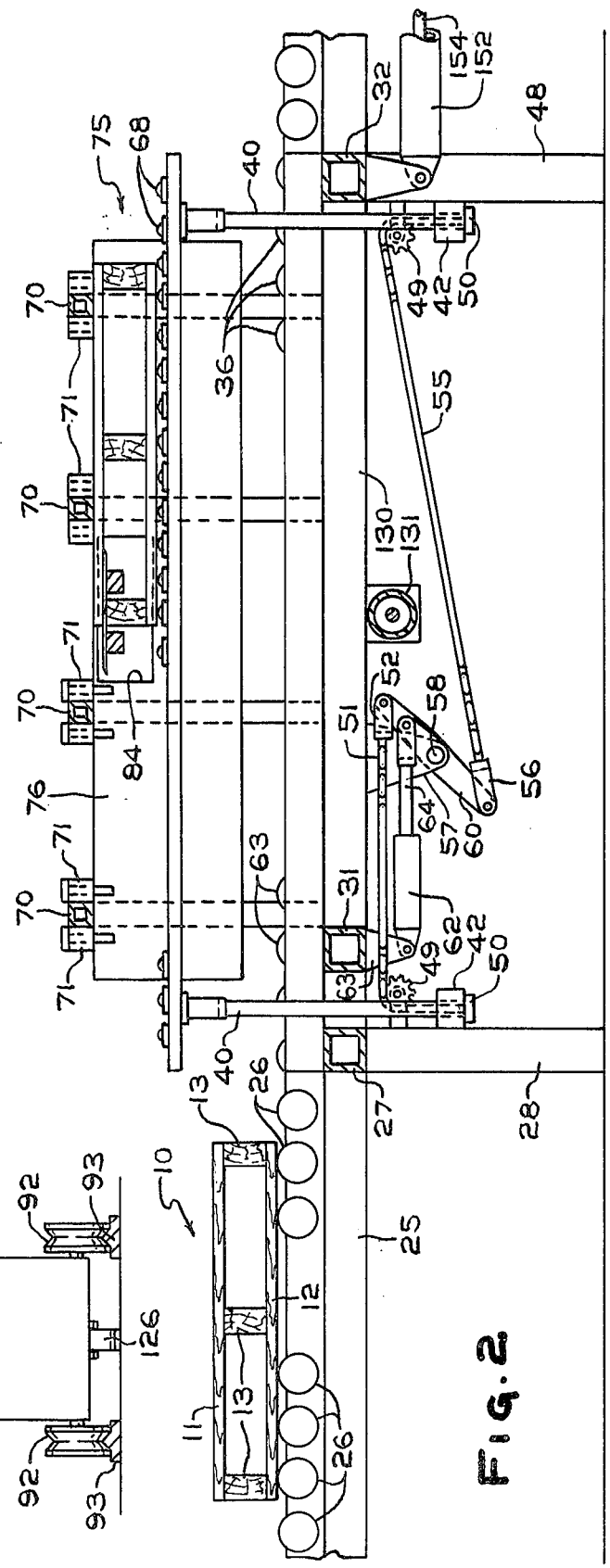

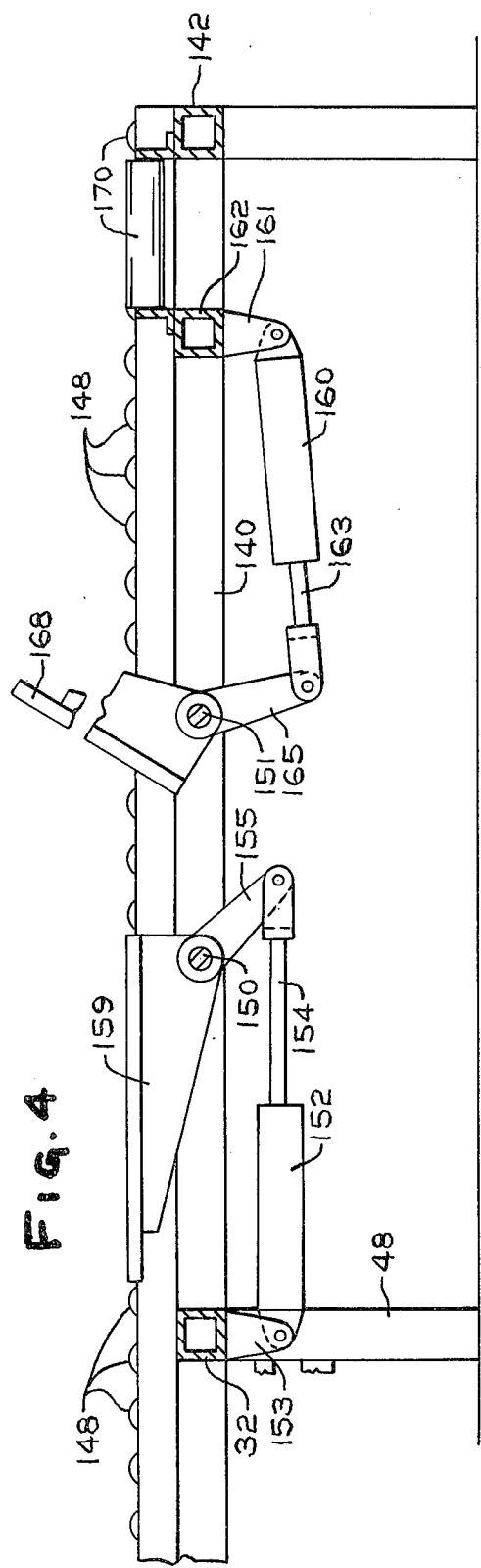
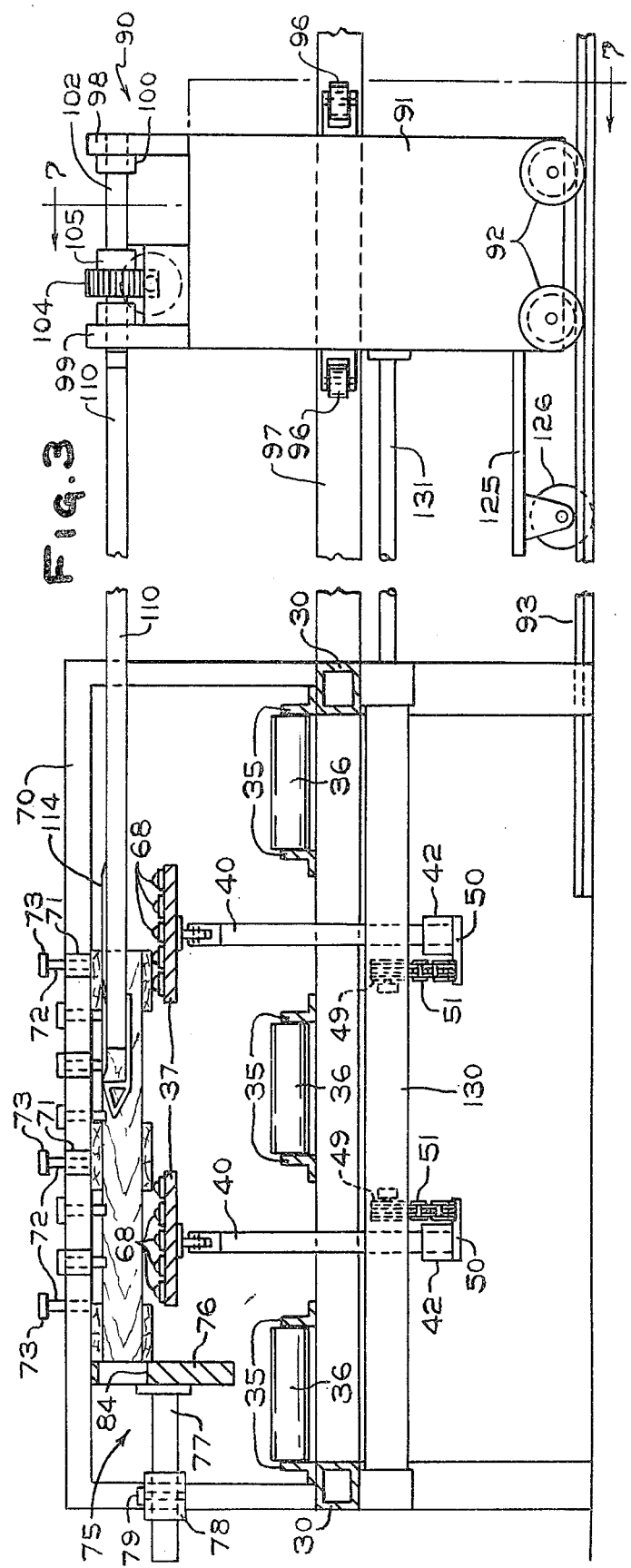

PALLET MACHINE

BACKGROUND OF THE INVENTION

This invention relates to an apparatus for repairing pallets and more particularly to an apparatus that can selectively remove certain stringers or deckboards or all of such stringers and deckboards in a wooden pallet to permit repair or complete disassembling.

Wooden pallets are used extensively in the transportation storage and moving of boxed, crated, bagged or strapped loads by various means such as fork lift trucks or similar machinery. In their process of use, the pallets are damaged to various degrees. Heretofore the damaged pallets were discarded because it was economically not feasible to repair them. More recently, it was found possible to repair them by providing a machine such as disclosed by U.S. Pat. Nos. 4,152,819 and 3,869,780. Such machines facilitated the repair of stringers or deckboards.

The present invention provides a new and improved structure that is more efficient in its action of cutting out deckboards or stringers selectively from a pallet in preparing such pallets for repair. Such apparatus can more efficiently permit repair of a pallet by quickly severing the upper and lower deckboards from the stringers without manipulating the pallet.

BRIEF DESCRIPTION OF THE DRAWINGS

FIG. 1 is a plan view of the pallet repairing apparatus showing two pallets thereon.

FIG. 2 is a side elevational view of the pallet repairing apparatus taken on line 2—2 of FIG. 1.

FIG. 3 is a transverse view of a portion of the pallet apparatus, in cross-section taken on line 3—3 of FIG. 1.

FIG. 4 is an enlarged side elevational view of a portion of the pallet apparatus taken on line 4—4 of FIG. 1.

FIG. 5 is an enlarged fragmentary plan view of the nail cutting mechanism.

FIG. 6 is an enlarged fragmentary side elevational view of the nail cutting mechanism.

FIG. 7 is a side elevational view of a moveable carriage that carries the nail cutting mechanism taken on line 7—7 of FIG. 3.

DETAILED DESCRIPTION

Referring to the drawings wherein similar numerals refer to similar parts throughout the several views there is shown in FIGS. 1 and 2 a wood pallet 10 having a plurality of spaced upper deckboards 11 and a plurality of spaced lower deckboards 12 separated by stringers 13. The deckboards are connected to the stringers by nails. There is no difference in the upper or lower deckboards except for convenience of reference in discussing the structure and operation of the pallet repairing apparatus. Although the pallet is shown as having three upper and three lower deckboards, the apparatus to be described is capable of handling pallets with a greater number of deckboards as well as a greater number of stringers.

The pallet repair apparatus has a receiving conveyor 20, a work station 21, and a repair station 22.

Receiving conveyor 20 has a suitable support or base frame which includes a pair of spaced side members 25 journaling rollers 26. Only a few of the rollers 26 are shown to more clearly illustrate the component parts and the pallet supported thereon. FIG. 1 discloses a pallet 10 resting on the rollers 26 of receiving conveyor 20. The side members 25 are interconnected by cross members 27 mounted on suitable leg members 28 (FIG. 2).

The work station 21 is a rectangular support frame which includes a pair of side tubular members 30 interconnected at their ends by end tubular members 31 and 32. A plurality of longitudinally extending pairs of angle irons 35 are attached to the respective end tubular members 30 to support rollers 36. A pair of laterally spaced plates 37 extending longitudinally between the rollers 36 are connected to vertically disposed rod members 40. The rod members 40 are journaled in suitable bearings 42, which bearings are attached to vertical leg members 28 and 48. Leg members 48 support the one tubular member 32 (FIG. 2). Also suitably attached as by brackets on the respective leg members 28 and 48 are sprockets 49. The lowermost end portion of each rod 40 has a plate 50 secured thereto. The plates 50 that are adjacent to the leg members 28 have one end of a sprocket chain 51 attached thereto with such sprocket chains 51 being trained around sprocket 49 and connected to a bracket 52. The plates 50 that are adjacent to the leg members 48 have attached to them sprocket chains 55, which sprocket chains 55 are trained about sprockets 49 that are adjacent to leg members 48 and are connected to a bracket 56. Suitably connected to the respective side tubular members 30 are brackets 57 which journal between them a cross shaft 58. Keyed for rotation with shaft 58 are three laterally spaced lever arms 60 (only one shown in FIG. 2). There are two outer lever arms 60 and one centrally located lever arm 60. The respective end portions of the two outer lever arms 60 are connected to brackets 52 and 56 and their respective sprocket chains 51 and 55. A hydraulic cylinder 62 has its head end suitably pivotally connected to a bracket 63 and its rod 64 pivotally connected to the intermediate lever arm 60 as shown in FIG. 1. Pressurization of the head end of cylinder 62 extends the rod 64 and rotates the lever arm 60 to the position shown in FIG. 2 wherein the respective rods 40 are raised vertically to raise the spaced plates 37 and the pallet supported thereon. Release of pressure from the head end of cylinder 62 and pressurization of the rod end of cylinder 62 pivots intermediately located lever arm 60 in a counterclockwise direction as shown in FIG. 2 along with shaft 58 and the respective outer lever arms 60 to move the rods 40 downwardly to the position wherein the rollers 68 on plates 37 are on the same level as support rollers 36. In this position, the rollers 36 and 68 are able to receive a pallet from the receiving conveyor 20.

Secured to the rectangular frame of work station 21 are a plurality of inverted U-shaped supports 70, the upper portions of which support a plurality of sockets 71. Slidably mounted in the respective bores of sockets 71 are pins 72 having flanged upper portions 73. Secured to the rearwardly disposed legs of U-shaped supports 70 is an adjustable stop member 75 having a flat plate member 76 supported by a pair of spaced rods 77 that extend rearwardly and are secured to a socket 78 by pins 79. Each socket 78 has a single bore that is adapted to register with one of the plurality of longitudinally spaced bores 80 in each rod 77. Plate member 76 has a rectangular shaped opening 84 in alignment with cutter means to be described to permit full extension of such cutter means past such plate member.

Assuming a pallet is located on the work station 21 with the stringers running in a direction parallel to axes that support idler rollers 36, the pallet is pushed against the stop 75. The head end of cylinder 62 is then pressurized which rotates the lever arm 60 in a clockwise direction as viewed in FIG. 2 which raises the laterally spaced plates 37 and the wooden pallet supported thereby. As the pallet is raised certain ones of the upper deckboards engage pins 72 while other pins 72 remain in their lowermost position as shown in FIGS. 2, 3, and 6 since they do not engage any deckboards or stringers. This random arrangement of moveable pins locks the pallet into a secure fixed position as the cutters engage the nails and allow the forces exerted thereon to accomplish the shearing of the nails in whatever position the pallet is placed. It is to be noted that FIG. 1 discloses the cutting means operating on the end stringer. The pallet is released from the locked position by retraction of the cylinder 62 which lowers the spaced plates 37 and the wooden pallet thereon.

Mounted to one side of the work station 21 is a cutting means 90, which includes a carriage 91 supported by four wheels 92 mounted on two parallel tracks 93. Journaled on the intermediate portion of carriage 91 are a plurality of rollers 96 in rolling contact with guide rails 97, which guide rails 97 are suitably secured to the work station 21 and a base frame with suitably cross braces. A pair of spaced brackets 98 and 99 are mounted on the uppermost portion of carriage 90. Bracket 98 has a bearing member 100 while bracket 99 has a bearing member 101 mounted thereon. A shaft 102 extends through the brackets 98 and 99 and is journaled for rotation in bearings 100 and 101. A spur gear 104 and collar 105 are keyed to shaft 102 for rotation therewith. The outboard end of shaft 102 that extends through bracket 99 is connected to a pair of longitudinally extending supports or support members 109 and 110, which support members 109 and 110 have flat rotary cutters 111 and 112 (FIG. 5) journaled on the outer end portions thereof or their outboard ends. Such outer end portion of the support members are interconnected adjacent to the cutters 111 and 112 by a flat cam plate 114 with guide bars or guide means 120 and 121 on the respective ends thereof. A hydraulic cylinder 122 (FIG. 1) is fastened to a bracket 99 having its piston rod 123 connected to a gear rack 124 that meshes with spur gear 104. Pressurization of the rod end of cylinder 122 maintains the spur gear 104 in the position shown in FIGS. 1, 5 and 7, whereas pressurization of the head end of cylinder 122 rotates spur gear 104 clockwise as seen in FIG. 7 whereby the respective support members 109 and 110 along with cutters 111 and 112 are similarly rotated 180° into a position as seen in FIG. 6 where the circular cutters 111 and 112 are in a position to shear the nails between the stringers and the lower deckboards. The lower end portion of carriage 90 has an extension 125 with a wheel 126 suitably journaled on the forward end thereof to stabilize the carriage 90 and the cutters 111 and 112 in their reciprocal movement on the rails 93. A hydraulic cylinder 130 is mounted transversely of side tubular members 30 with its piston rod 131 connected to carriage 90. Reciprocation of carriage 90 is controlled by the pressurization of cylinder 130.

After removal of the nails between all or portions of the deckboards and the stringers of the pallet on work station 21, the pallet is moved to the repair station 22 which consists of a rectangular framed structure including side members 140-141 and end member 142 and 32, which member 32 is the end tubular member 32 shared on work station 21. Repair station 22 has additional longitudinally extending frame members 143, 144, 145 and 146 which support idler rollers 148. A pair of spaced shafts 150 and 151 are journaled for rotation in frame members 143, 144, 145 and 146. A hydraulic cylinder 152 (FIG. 4) has its head end pivotally connected to a bracket 153 and its rod 154 connected to a crank arm 155 that is keyed to shaft 150. Also keyed to shaft 150 are a pair of laterally spaced arm members 158-159. Pressurization of the rod end of cylinder 152 pivots the arm members 158 and 159 in a clockwise direction as viewed in FIG. 4 while pressurization of the head end of cylinder 152 pivots the arm members 158 and 159 in a counterclockwise direction to the position shown in FIG. 4 wherein the top surfaces of the arm members 158 and 159 are coplanar with the top surfaces of rollers 148.

A hydraulic cylinder 160 has its head end pivotally connected to a bracket 161 which in turn is secured to a cross brace 162. The rod 163 of cylinder 160 has its rod end connected to a crank arm 165 that is keyed to shaft 151. Also keyed to shaft 151 are a pair of laterally spaced arm members 168 and 169 which are rotated with such shaft 151 upon actuation of cylinder 160. Mounted between cross brace 162 and frame end member 142 are a plurality of rollers 170 to facilitate the rotation of a pallet on such repair station 22.

In the operation of the apparatus described above, the operator or operators position a wooden pallet onto the rollers 26 of receiving conveyor 20 which facilitates the positioning and movement of the wooden pallet onto the work station 21. Assuming a wooden pallet is located on the work station 21, the operator then moves the wooden pallet to align a specific stringer in alignment with the cutting means 90. Assuming an end stringer is damaged, and needs replacing, the wooden pallet is pushed against stop 75 with the end stringer in alignment with the cutting means, such as depicted by FIG. 1. To lock the pallet at this position, the head end of cylinder 62 is pressurized, which action extends the piston rod 64 to rotate lever arm 60 in a clockwise direction which rotates shaft 58 and the other lever arms 60 in a similar manner to raise the laterally spaced plates 37 and the wooden pallet that is supported thereon. As the pallet is raised, certain ones of the upper deckboards engage pins 72 and move the pins 72 upwardly therewith while other pins 72 remain unengaged and due to their numerous number and their randum dispersion on the supports 70, the pins 72 lock the pallets securely from moving on the raised plates 37 by their engagement with the side edges of the upper deckboards and stringer. The wooden pallet is raised to position the juncture of the end stringer with the upper deckboards in alignment with the pair of cutters 111 and 112. This alignment is such as to position the cutters in line with the nails joining the upper deckboards to the end stringer. The rod end of cylinder 130 is then pressurized which moves the cutting means 90 and the carriage 91 towards the wooden pallet. The wheels 92 ride on rails 93 while rollers 96 maintain rolling contact with the guide rails 97 as the cutters 111 and 112 come into rolling and shearing contact with the nails between the end stringer and the top deckboards 11. The guide bars 120 and 121, forwardly of the cutters 111 and 112 facilitate the accurate advance of the cutters while flat cam plate 114 prevents the spreading of support members 109 and 110 and also aid in the cutting action as it acts as a wedge between the stringer and the upper deckboards to provide a clearance space to reduce the friction on the rotating cutters 111 and 112. The opening 84 in plate member 76 of stop member 75 permits the full extension of the cutters 111 and 112 to completely sever all nails between the upper deckboards and the end stringer. After retraction of the cutter means, cylinder 122 is pressurized to rotate spur gear 104 which rotates shaft 102 and the longitudinally extending support members 109 and 110 180° which positions the flat rotary cutters 111 and 112 in alignment with the juncture of the lower deckboards 12 and the end stringer. Pressurization of the rod end of cylinder 130 moves the cutters 111 and 112 into engagement with the nails for severing completely all nails attaching the end stringer to the upper and lower deckboards 11 and 12. Upon retraction of the cutter means 111 and 112 along with carriage 91, the wooden pallet is then released from its locked position by retracting the plates 37 which lowers the pallet and places it in alignment with the repair station 22. The wooden pallet is then moved manually onto repair station 22 where the operator removes the end broken stringer and inserts a new stringer therein. The operator nails the top deckboards to the new stringer and then positions the wooden pallet so that one end is between arm members 158, 159 and arm members 168, 169. The rod ends of cylinders 152 and 160 are pressurized to pivot the respective arm members 168, 169, 158 and 159 into a vertical attitude which positions the pallet in a vertical condition. With the head end of cylinder 160 then pressurized, the wooden pallet along with arm members 168 and 169 are then pivoted clockwise as seen in FIG. 4 to invert the wooden pallet, such that the lower deckboards 12 are now on top of the pallet allowing the nailing of the lower deckboards to the end stringer to complete the repair thereof. Such manuevering of the arm members 158, 159, 168 and 169 cooperate as a means for upsetting or flipping the pallet from one side to the other side to present the bottom deckboards into the top deckboard. Rollers 170 facilitate the re-positioning of the pallet during the repair of the pallet when it is inverted and also facilitates the removal of the wooden pallet from the apparatus.

Various modifications are contemplated and may obviously be resorted to by those skilled in the art without departing from the described invention, as hereinafter defined by the appended claims, as only a preferred embodiment thereof has been disclosed.

I claim:

1. An apparatus for the disassembling and repairing of nailed wooden pallets, said apparatus having a support frame, a carriage mounted on one side of said support frame, said carriage having a pair of longitudinally extending supports for movement therewith, said supports having outboard ends, nail cutting means mounted on said outboard ends of said supports, said nail cutting means being flat rotary disks lying generally in a horizontal plane, drive means connected to said carriage for advancing and retracting said carriage to and from said support frame, inverting means mounted on said carriage and connected to said carriage supports for rotating said carriage supports and their cutting means selectively 180° to align said cutting means with the juncture of the upper or lower deckboards with a stringer in said pallet, and lock means for securing said pallets on said support frame.

2. An apparatus for disassembling and repairing of nailed wooden pallet as set forth in claim 1 wherein said carriage has a rotatable shaft connected to said carriage supports, said shaft has a spur gear keyed thereto, said inverting means includes a power operated rack connected to said spur gear for rotating said spur gear.

3. An apparatus for disassembling and repairing of nailed wooden pallets as set forth in claim 2 wherein said support frame has means for raising and lowering a wooden pallet positioned thereon, and said lock means on said support frame having a plurality of vertically moveably plungers selectively engageable by the deckboards on a raised wooden pallet.

4. An apparatus for disassembling and repairing of nailed wooden pallets as set forth in claim 3 wherein a repair station is positioned adjacent said support frame, said repair station having a plurality of rows of rollers for manuevering pallets thereon, and a pallet flipping means mounted on said repair station operative to invert such pallet to present the top deckboards into contact with said rollers on said repair station to facilitate repair of such pallet.

5. An apparatus for the disassembling and the repairing of nailed deckboards to stringers in a wooden pallet wherein such pallet has upper deckboards and bottom deckboards; said apparatus having a support frame; said frame having a forward; a rearward portion and two side portions; said frame having a plurality of rollers for supporting a pallet thereon; a pair of laterally spaced plates with rollers thereon; said rollers on said support frame and said rollers on said plates being at the same horizontal level; power operated means connected to said plates for raising and lowering said plates; a plurality of horizontally extending bars secured to said support frame and located above said support frame; a plurality of sockets secured to each of said bars; each of said sockets supporting a vertically moveable plunger bar; each of said plunger bars extending below said sockets for engagement with side surfaces of said deckboards upon elevation of said deckboard and pallet by said laterally spaced plates; one side portion of said support frame having a stop plate for limiting the movement of said pallet on said rollers; a carriage located on the other side portion of said support frame for movement toward and away from said one side portion; cutting means mounted on said carriage for severing nails at the juncture of said upper deckboards with said stringers; and power operated means on said carriage for adjusting said cutting means for selectively aligning said cutting means at the juncture of said bottom deckboards or said upper deckboards with said stringers.

6. An apparatus for the disassembling and the repairing of nailed deckboards to stringers of a wooden pallet as set forth in claim 5 wherein said stop plate has an opening therein in alignment with said cutting means on said carriage to facilitate the movement of said cutting means therethrough.

7. An apparatus for the disassembling and the repairing of nailed deckboards to stringers of a wooden pallet as set forth in claim 6 wherein said power operated means for adjusting said cutting means includes a rotatable shaft journaled on said carriage and connected to said cutting means; gear means connected to said shaft to control the degree of rotation of said shaft, and a power driven rock gear connected to said gear means to control the rotation of said gear means.

8. An apparatus for the disassembling and the repairing of nailed deckboards to stringers of a wooden pallet as set forth in claim 7 wherein a repair station is positioned adjacent said support frame, said repair station having a plurality of rollers for manuevering pallets thereon; and a pallet flipping means mounted on said repair station between said rollers to invert such pallet to present the top deckboards into rolling contact with said plurality of rollers on said repair station.

* * * * *